US011200631B2

(12) United States Patent
Eskandari (10) Patent No.: US 11,200,631 B2
(45) Date of Patent: Dec. 14, 2021

(54) SYSTEM AND METHOD FOR ARRANGING COMMUNICATION AMONG PARTIES

(71) Applicant: Hani Eskandari, Vancouver (CA)

(72) Inventor: Hani Eskandari, Vancouver (CA)

( * ) Notice: Subject to any disclaimer, the term of this patent is extended or adjusted under 35 U.S.C. 154(b) by 88 days.

(21) Appl. No.: 16/679,122

(22) Filed: Nov. 8, 2019

(65) Prior Publication Data

US 2020/0160475 A1 May 21, 2020

Related U.S. Application Data

(60) Provisional application No. 62/768,311, filed on Nov. 16, 2018.

(51) Int. Cl.
| | |
|---|---|
| *G06Q 30/00* | (2012.01) |
| *G06Q 50/30* | (2012.01) |
| *H04L 29/06* | (2006.01) |
| *G06Q 30/08* | (2012.01) |
| *G06Q 20/10* | (2012.01) |

(52) U.S. Cl.
CPC .......... *G06Q 50/30* (2013.01); *G06Q 20/108* (2013.01); *G06Q 30/08* (2013.01); *H04L 65/1069* (2013.01)

(58) Field of Classification Search
None
See application file for complete search history.

(56) References Cited

U.S. PATENT DOCUMENTS

| | | | | |
|---|---|---|---|---|
| 2013/0208085 A1* | 8/2013 | Marion | .............. | G06Q 30/0603 348/36 |
| 2014/0143141 A1* | 5/2014 | Kumar | .................... | H04L 51/04 705/39 |
| 2014/0337093 A1* | 11/2014 | Jain | ........................ | H04L 67/306 705/7.29 |
| 2016/0063448 A1* | 3/2016 | Freeland | ............. | G07F 17/0021 705/7.19 |
| 2017/0316470 A1* | 11/2017 | Proctor | .............. | G06Q 30/0284 |
| 2018/0115645 A1* | 4/2018 | Iyer | ................ | G06Q 10/063112 |
| 2018/0121859 A1* | 5/2018 | de Bold | .................... | G06N 5/04 |

* cited by examiner

*Primary Examiner* — Mila Airapetian
(74) *Attorney, Agent, or Firm* — Brett A. Schenck (57) ABSTRACT

A computer-implemented method for arranging communication between two or more users is provided. The two or more users including at least a first client and at least a first consultant. The first computing device is associated with the at least first client. The second computing device is associated with the at least first consultant. The method includes operations performed by at least one computer processor. The operations include enabling the at least first computing device to send a request to a server, identifying a list of matching consultants associated with the server, wherein the at least first consultant is identified as a matching consultant from the list of matching consultants, sending a notification from the server to enable the at least first consultant to accept or decline the consultation request, establishing a communication session between the at least first client through the first computing device and the at least first consultant through the second computing device, and enabling the at least first client and the at least first consultant to communicate in real-time.

20 Claims, 4 Drawing Sheets

SYSTEM AND METHOD FOR ARRANGING COMMUNICATION AMONG PARTIES

CROSS-REFERENCE TO RELATED APPLICATIONS

The application claims the benefit under 35 U.S.C. § 119(e) to a U.S. provisional application having Application No. 62/768,311, filed Nov. 16, 2018, the entirety of which is herein incorporated by reference.

FIELD

The present invention relates to computer software and data processing. More specifically, the present invention relates to a system and method for arranging communication among two or more parties.

BACKGROUND

Current question-and-answer (Q&A) systems include web applications such a Quora or StackExchange which enable a user to post a question and a multitude of other users to reply with their answers to the posted question. Other users on the system can then rate and rank the answers to select the most popular or the highest-ranked answer. Such systems do not yield an instantaneous preferred answer to the question. Furthermore, a series of follow up Q&A on the same topic or question between the person who posted the question and the person who replied a high-ranked answer may take anywhere between a few hours and a few months to complete.

Other software platforms exist that let a first user or employer post a problem or a project and other users or consultants reply with their proposals. The first employer can then review the received proposals and the see profile of each consultant on the platform and select the most desirable consultant or proposal for consulting engagement. The employer and the selected consultant can then sign an engagement contract to work on the project. Such systems are suitable for long term projects where several proposals need to be reviewed before one is selected for further engagement. These systems are not suitable for short-term engagements where a first user needs to get the answer to a question or problem instantly or in a short period. Examples of such platforms include Upwork, Toptal and Bark.

SUMMARY

In one aspect of the present invention, a computer-implemented method for arranging communication between two or more users is provided. The two or more users including at least a first client and at least a first consultant. The first computing device is associated with the at least first client. The second computing device is associated with the at least first consultant. The method includes operations performed by at least one computer processor. The operations include enabling the at least first computing device to send a request to a server, identifying a list of matching consultants associated with the server, wherein the at least first consultant is identified as a matching consultant from the list of matching consultants, sending a notification from the server to enable the at least first consultant to accept or decline the consultation request, establishing a communication session between the at least first client through the first computing device and the at least first consultant through the second computing device, and enabling the at least first client and the at least first consultant to communicate in real-time.

In another aspect of the present invention, system for enabling real-time communication between two or more users is provided. The system includes two or more users including at least one client and at least one consultant. The system includes at least one client computing device. The client computing device includes client computing device memory, one or more client computing device processors, client computing device network resources, and client computing device peripherals. They system further includes at least one consultant computing device, wherein the consultant computing device includes consultant computing device memory, one or more consultant computing device processors, consultant computing device network resources, and consultant computing device peripherals. The one or more client computing device processors are configured by a first set of instructions to enable the client operating the client computing device to send a consultation request to a server. The server is configured to identify a list of matching consultants associated with the consultation request, wherein the consultant is identified as a matching consultant from the list of matching consultants, The one or more consultant computing device processors are configured by a second set of instructions to enable the consultant that operates that computing device to accept or decline the consultation request. The one or more client computing device processors and the one or more consultant computing device processors are configured by a third set of instructions to establish a communication session between the client and the consultant, and enable the client and the consultant to communicate in real-time.

Other aspects of the disclosed a system and method for arranging communication among two or more parties will become apparent from the following detailed description, the accompanying drawings and the appended claims.

DETAILED DESCRIPTION

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

A system and method are described for enabling a communication channel between two or more individuals. In one embodiment depicted in FIG. 1, a first person 110A herein called client, sends a request through a network 130 to a server 140 using a computing device 120A. Said request sent to a server 140 may contain information about a specific topic to which said client 110A is seeking answer. In this embodiment the server 140 identifies one or more individuals 110B, 110C and 110D, herein called consultants, who can potentially answer a question asked by the client 110A in said specific topic. The request may also contain a fee arrangement determined by the system, by the client or by the consultant. The system may then send a notification to computing devices 120B, 120C and 120D of the consultants 110B, 110C and 110D, wherein the notification solicits instant response from the consultants. A consultant 110B may respond to the notification and agree to connect with the client 110A. The system will then establish a communication channel through the network 130 between the client 110A and the consultant 110B to enable the client 110A and the consultant 110B to communicate and discuss a certain question or discuss said topic in real-time. Any person using the system as a client or a consultant is herein referred to as user.

Figure 1:
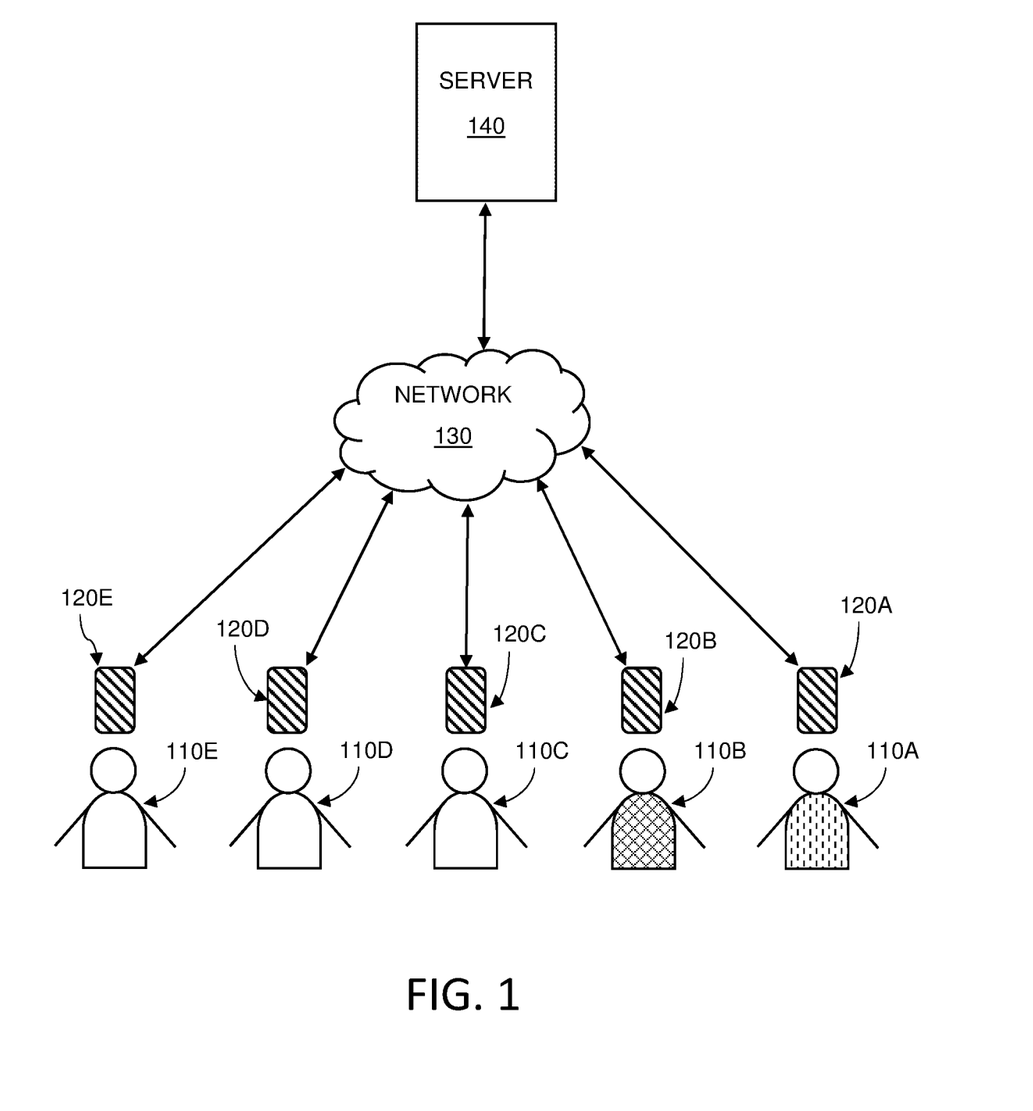
FIG. 1 is a diagram of an exemplary environment in accordance with an embodiment of the invention.

In one embodiment of the invention the computing device of a client 110A sends to the server 140, information about a topic that the client wants to inquire about. In this embodiment, other information may also be sent to the server 140 by a computing device 120A of the client 110A, such information may include a question asked by the client 110A, the preferred level of expertise of the consultant or the preferred rating of the consultant, fee arrangement and time or date that a consultancy session is being requested by the client.

At least one of the computing devices of the client and the consultant may be a mobile handset. Such mobile handsets may include but are not limited to handheld telephone systems such as Apple iPhone, an Android phone or phones running or phones running other operating systems. The mobile handsets may be tablet devices such as Apple iPad, Android tablets or tablets running other operating systems. A computing device may refer to any computer device that includes at least one processor (herein also referred to as CPU), computer memory and means to communicate computer instructions between the processor and the memory. The computing device may also include one or more peripherals to enable data communication. Such peripherals may be a microphone, a speaker, a camera or keyboard. The keyboard may be a virtual keyboard on a touch screen. Alternatively, the keyboard may include physical buttons. Such peripherals may enable the communication between the client and the consultant via voice, video, text chat or a combination thereof. The computing device may also include network resources, such as but not limited to modems, router or wireless cards, to enable the computing device to connect to internet or to communicate with remote servers such as servers installed in the cloud platforms.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

In one embodiment, the invention comprises at least one programmatic module that may execute on a computing device of one or more clients, at least one programmatic module that may execute on a computing device of one or more consultants and at least one programmatic module that implements on a server.

One or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums. Additionally, embodiments may be implemented in the form of computer-programs, or a computer usable carrier medium capable of carrying such a program.

Figure 2:
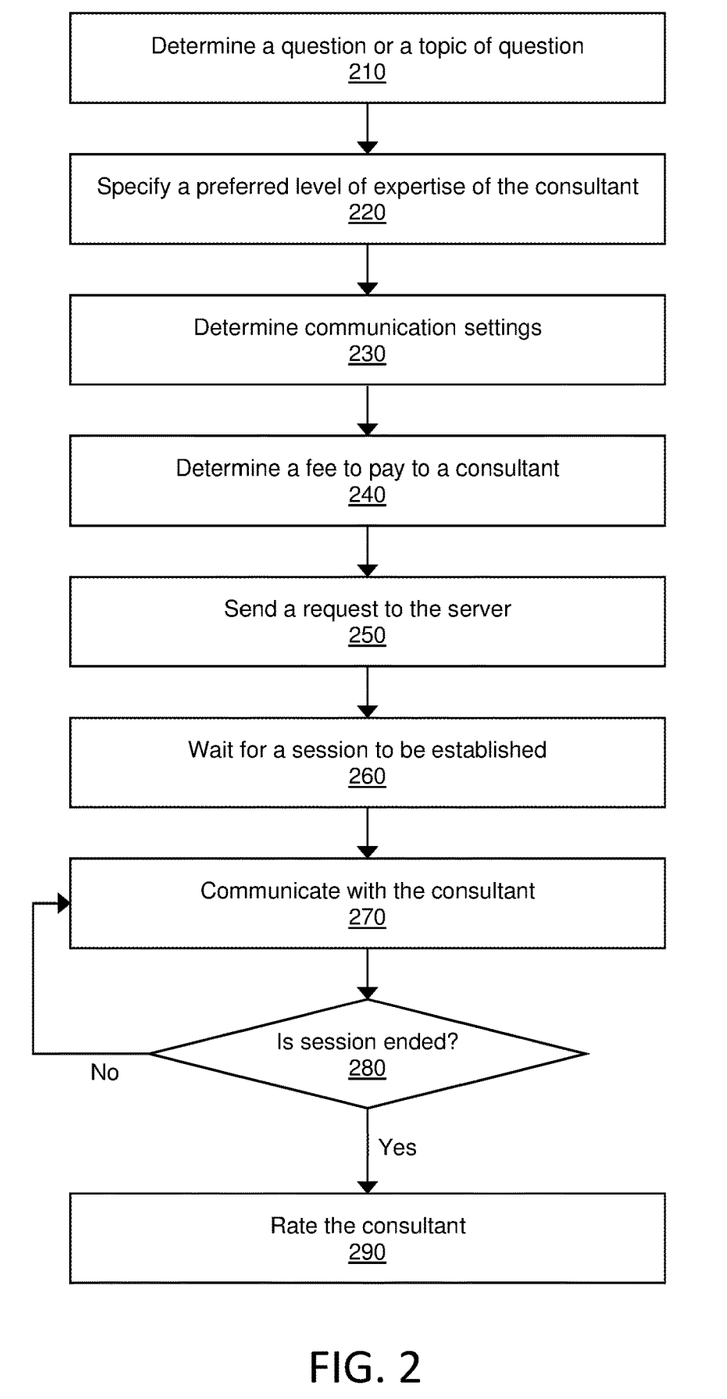
FIG. 2 is a flowchart illustrating one exemplary embodiment that illustrates how a client uses the system to communicate with a consultant.

In one embodiment depicted in FIG. 2, a client determines a question or a topic of question to be asked from or discussed with a consultant (210). The question may be specified in various ways such as, but not limited to, typing in an input box on a computing device or speaking to a microphone of a computing device. The topic of question may be determined via selecting from one or more options displayed on a computing device of the client. Methods to determine a question or a topic of question are similar to methods to input a text, a sentence or a voice on a computing device which are well known to the skilled in the art of software development. Furthermore, methods to select a topic of question are similar to method to select at least one option from a list of one or more options using the graphical user interface of a computing device which are well known to the skilled in the art of software development. Any subject area or area of expertise determined by a question or topic of question is herein referred to as subject matter. For example, the subject matter of the question "What is a black-hole?" can be "Physics" or "Astrophysics". As another example, the subject matter of the question "What should I input in box 123 of my annual tax return?" can be "Accounting", "Tax" or "Personal Tax". A question may have one or more subject matters.

In one example of this embodiment, a topic of question or a subject matter is inferred or interpreted from a question specified by the client using an algorithm. Said algorithm may or may not use the techniques well known to the skilled in the art of machine learning and artificial intelligence. Such techniques may include methods such as topic extraction, knowledge sensing or natural language processing. The algorithm may identify the question and one or more words in the text of the question. Using machine learning algorithms, the algorithm may then apply topic extraction or natural language processing techniques to infer the subject matter or topic of question.

The client may or may not specify a preferred level of expertise of a consultant (220). In one example of this embodiment, the client can select the preferred level of expertise of a consultant by selecting from multiple options. Such options may indicate different levels of expertise such as novice, intermediate or expert. Other options that indicate various levels of expertise of a consultant are permissible. In another example, the client can select the preferred level of expertise of a consultant by specifying a lower-bound or upper-bound of the rating of the consultant. Such specified rating may indicate a maximum, a minimum or an approximate rating of a preferred consultant in a subject matter determined by said question or topic of question.

In this embodiment, the client may optionally determine the communication settings (230). Communication settings may include options to select the method of communication. For example, the client can choose to communicate with text-messaging, audio or video. Text messaging is herein referred to as chat. Audio communication may herein be referred to as voice. All of these methods of communication may be directed through a mobile carrier or through internet. Another example of a communication setting that may be determined by the client is the duration of the requested communication session, herein referred to as session, with a consultant. The client may choose to save the preferred method or settings of communication in said client's account. Such preferred settings, herein referred to as default communication settings for client may be stored on the server or on a computing device of the client.

In one example of this embodiment, the communication settings may include the date or time that the client wants to communicate with a consultant.

In this embodiment, the client may or may not specify the fee to be paid to the consultant (240). Such fee payment may be accomplished via direct deposit from a financial account of the client to a financial account of a consultant. A financial account may be a bank account in a financial institution or a billing account on the system. Furthermore, the fee payment may be accomplished via tokens which may or may not have monetary value. Such tokens may be exchanged between clients and consultants on the system to facilitate transactions. In this disclosure, funds may refer to but is not limited to any currency, any digital currency or any token.

In one example of this embodiment, the server 140 finds one or more consultants that match the criteria specified by the client in previous steps (i.e. steps 210, 220 and 230). Each consultant may have a preferred fee schedule specified in each consultant's account for the subject matter related to the question or topic of question. Based on the fees associated with all matching consultants, the server may present the client with a minimum, maximum and a median or average fee. The client may view this information presented by the server and then select the fee to be paid to a consultant (240). In another example of this embodiment, the server determines the fee for a session. The server may determine the fee based on one or more parameters such as the subject matter, topic of question, communication type (e.g. chat, audio or video) and duration of the session.

In this embodiment a request is then formed by the computing device of the client and sent to the server (250). Said request may contain information about the question, topic of question, fee arrangement, expertise level of the consultant or the communication settings. In one example of this embodiment, the client may wait for a brief period until the server finds a matching consultant from a pool of consultants and establishes a connection between the client and the matching consultant (260). The client then starts communicating with the consultant (270) until either the communication is terminated by either the client or the consultant or the session expires (280). A communication session may expire if for example its time duration exceeds the designated duration specified in the communication settings.

In this embodiment, the client may optionally rate the consultant based on different factors (290). For example, the client may rate consultant's knowledge of the subject matter they have discussed. In another example, the client may rate consultant's courtesy to indicate how respectful the consultant conducted the communication. In one embodiment, the client may provide a written feedback or review for the consultant which may or may not be visible to the consultant.

In some embodiments, a user of the system may use one or more software components or application modules to use the system as a client and a different set of software components or application modules to use the system as a consultant. In other embodiments depicted in FIG. 3, a user 310 of the system may use the system both as a client and as a consultant. In this embodiment, a user may have at least one consultant account 320 stored in one or more databases and at least one client account 330 stored in one or more databases. The user may also have other information, data or settings, herein referred to as common account 340, stored in other databases which can be accessed by said user's client account or consultant account.

Figure 3:
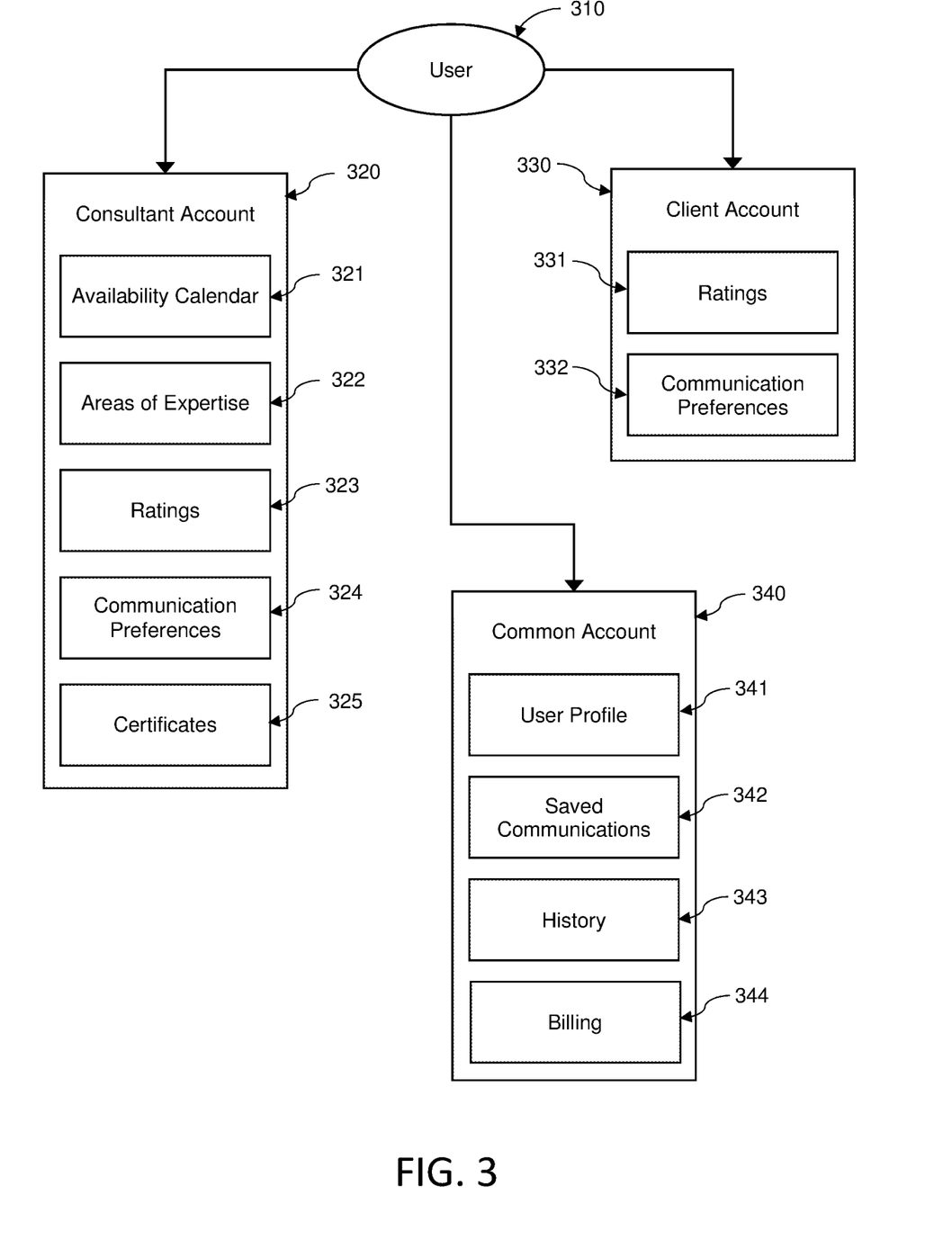
FIG. 3 illustrates components of a user account according to some embodiments of the invention.

In this embodiment, the consultant account 320 of a user may have one or more components including but not limited to an availability calendar 321, areas of expertise 322, ratings 323, communication preferences 324 and certificates 325.

The availability calendar 321 may be a digital calendar that specifies when the consultant is busy and when the consultant is available to participate in a session with a client. The availability calendar 321 may be in the form of a digital calendar in which the consultant specifies his or her busy or available time slots. In one example, the availability calendar 321 may comprise a few options in which the consultant indicates his or her general availability during days of the weeks or hours of the days. For instance, the consultant may specify that he or she is available only on Wednesdays and Saturdays between 6 pm to 11 pm at a specific time zone. Alternatively, the availability calendar 321 may be a digital calendar that is linked to third-party digital calendar applications such as Google Calendar.

A consultant may specify his or her areas of expertise 322 in some components of the consultant account. The areas of expertise may correspond to the subject matter areas that relate to the questions asked by the clients of the system. A consultant may have a separate rating 323 for each area of expertise specified in his or her account. The consultant account may comprise at least one overall rating corresponding to the consultant's level of knowledge or the consultant's courtesy in communicating with clients. Such ratings are determined or calculated from all or some of the ratings submitted to the system by clients who communicated in the past with said consultant.

A consultant may specify in some component of the consultant account his or her communication preferences 324, herein referred to as default communication settings for consultant. Such settings may or may not include the preferred method of communication, e.g. chat, voice or video, maximum or minimum duration of a session, preferred or minimum fee schedule and the minimum rating of the client to engage in a session with.

A consultant may also specify in some component of the system, his or her certificates 325 that may relate to the consultant's areas of expertise. For instance, the consultant may submit or upload copies of his or her certificates to his or her account. Alternatively, the consultant may submit a certificate via email or have the institution that issued the certificate, send it to the system administrative staff via mail or email for verification.

If certain requirement or quality level for a consultant's certification can be verified or validated, the system may award a badge or status to the consultant indicating that the consultant can be designated as a verified expert in a particular area of expertise or in a particular subject matter. Such badge or status is herein called verified expert badge. Clients, while, before or after selecting the level of expertise of the consultant 220, may also choose to only communicate with a verified expert.

The system may enable consultants to link to some third-party online education applications such as, but not limited to Coursera, Udemy or edX. This way, the system can verify that the consultant has taken or has passed certain online courses. The system may then validate the consultant's level of knowledge in certain areas of expertise. Verified certificates may be used by the system to ascertain that the consultant has at least certain level of expertise in specific subject matters and to give the consultant some additional credit in the system, increase his or her rating or award him or her a higher consultant status on the system.

The user may have a client account 330. The client account may comprise one or more components including but not limited to ratings 331 and communication preferences 332. The ratings section may comprise at least one rating for the client that is determined or calculated from all or some of the ratings submitted to the system by consultants who communicated in the past with said client. In one example, said at least one rating may include the rating of the courtesy or communication skills of the client. The default communication settings for client may be stored as part of the communication preferences 332.

The user may have a common account 340 which may comprise one or more components including but not limited to user profile 341, saved communications 342, history 343 and billing 344. The user profile 341 stores profile information such as name, nickname, password, location and timezone. Saved communications 342 may contain detailed communications that the user has had within a certain period of time. For instance, saved communications 342 may contain the saved chat, voice or video communications of the user in the past 24 hours or any other time period. Furthermore, saved communications 342 may contain any communication or conversation that the user had and wanted to store for a certain period of time. Such saved communications may be used advantageously by a user to review at a later time or to remember important advices received from a consultant. A record of all or some of the communications that a user had as a client or a consultant may be saved in one or more sections in the system, herein coined as history 343. Billing information such as bank account information or the number of tokens or credit a user has is stored in the system in a section herein called billing 344. Billing 344 may also include components to enable the users to buy more credit or token or convert their available tokens and credit into cash through issuance of cheques, bank drafts, via direct deposit or through any other means that provides them access to the fund.

Figure 4:
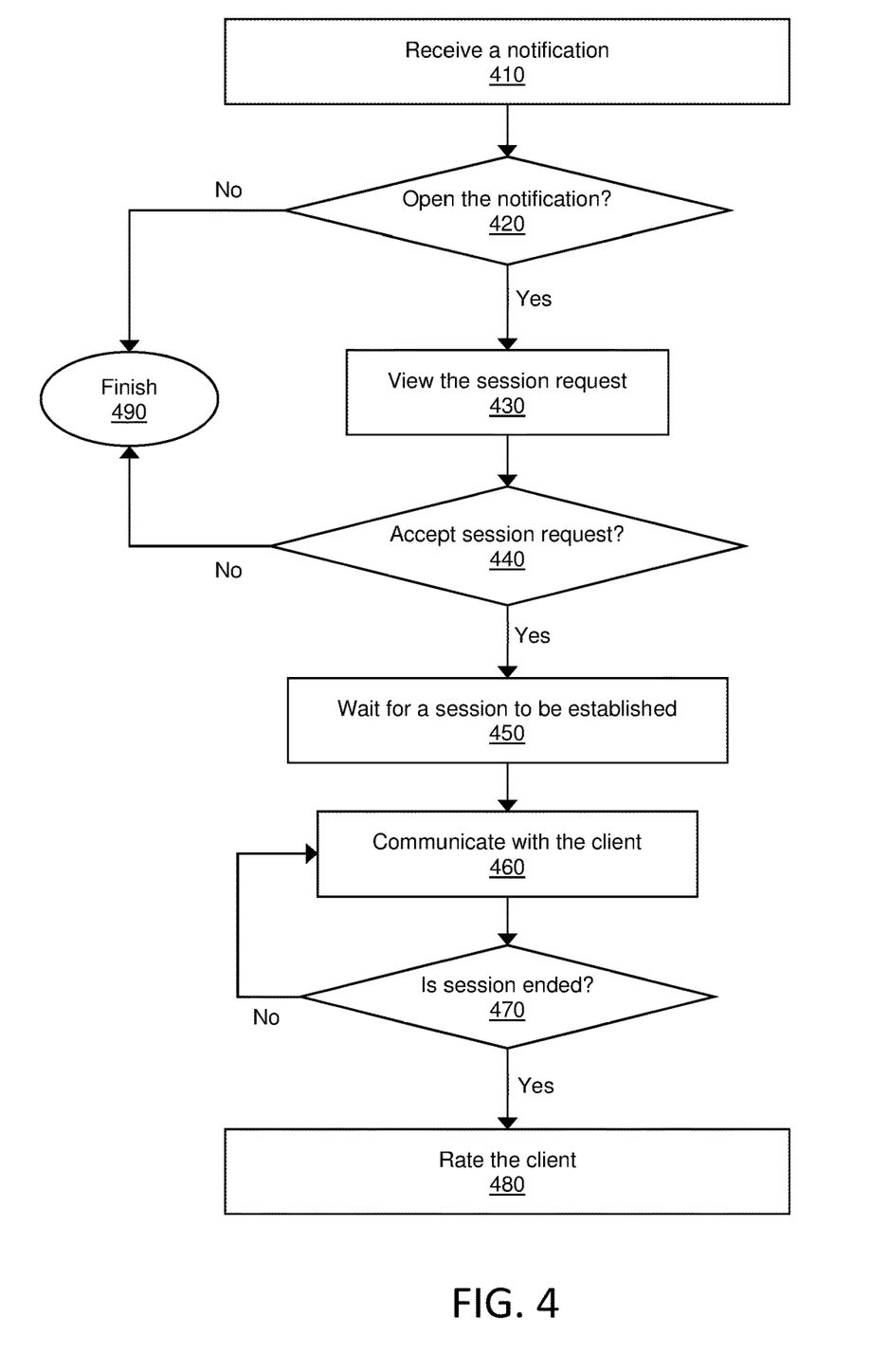
FIG. 4 is a flowchart illustrating one exemplary embodiment that illustrates how a consultant uses the system to communicate with a client.

In one embodiment depicted in FIG. 4, a consultant may receive a notification 410 from the server 140 on his or her computing device. This notification may indicate that the consultant received a consultation request. The notification may be received in different ways, such as but not limited to push notification, email, text message, instant message or application alert. If the consultant does not open or respond to the notification (e.g. ignores or misses the notification) within a certain period 420, then the consultant may miss the chance (490) to respond to it. The consultant may open the notification 420 and view the session request 430. The session request displayed on the computing device of the consultant may or may not contain a topic of question, a question, subject matter, client's rating, fee arrangement, type and duration of communication that is requested. The consultant may then choose 440 to decline, ignore or miss the session request 490 or to accept the request. Once the consultant accepts a session request, a communication session will be established 450, and the consultant then starts communicating with the client (460) until either the communication is terminated by either the client or the consultant or the session expires (470). In this embodiment, the consultant may optionally rate the client based on different factors (480). For example, the consultant may rate client's courtesy or communication skills to indicate how respectful or communicative the client was. In one embodiment, the consultant may provide a written feedback or review for the client which may or may not be visible to the client.

Once a request 250 is formed by the computing device of the client, the server 140 may identify one or more consultants who match the request. In one embodiment, the server may send a notification 410 to the computing device of a first matching consultant and wait a certain period of time for the first matching consultant to accept the request 440. If the first matching consultant does not accept the request, a notification may be sent to a second matching consultant. The same process as the one with the first matching consultant can repeat with the next matching consultants until one consultant accepts the request. A session will then be established 450 between the client and the matching consultant who accepts the session request. The server may or may not prioritize the matching consultants to send them an incoming notification. Such prioritization may be done randomly or based on one or more criteria. For example, the server may prioritize the matching consultants based on their level of knowledge or rating in the subject matter of the question that is asked by the client. Alternatively, the server may prioritize the matching consultants based on one or more factors including but not limited to their courtesy rating, geographic location with respect to the client, level of activeness on the platform or system, certifications related to the subject matter or whether they are verified experts in the subject matter.

In another embodiment, the server may send a notification to all matching consultants and may establish a connection between the client and the matching consultant who first accepts the session request.

In still another embodiment, different matching consultants may lower bid or offer on the request sent by the server by suggesting a lower rate for a session request. The consultant who places the lowest bid and demands the least amount of money or token may be selected by the server and may connect with the client.

The system may use geolocation technologies on the computing devices of the users to obtain their locations and advantageously use the locations to improve any services on the system including the process of matching the clients and the consultants. Such geolocation technologies may include but are not limited to GPS, WiFi or WiMax.

The communication between a client and a consultant may or may not be anonymized. Each user, either as a client or a consultant may choose to participate in a communication anonymously, using a nickname or using his or her real name.

In some embodiments, the communication between clients and consultants may be established through a server 140. The serve may be, for example, a cloud server that comprises one or more computing devices at a remote location. In other embodiments the communication between clients and consultants may be peer-to-peer connection. In yet other embodiments, the server 140 may be a distributed application, a decentralized network or a blockchain.

In one embodiment, the client may determine the question or topic of question and the level of expertise of the consultant and request a session to be established at a future time. The client may thus determine a certain time when he or she wants the session to start. The server may find a matching consultant who will be available and accepts the request to communicate with the client at that particular time. The server may initiate a session between the client and the consultant at the requested time.

While a communication session is in progress, the client or the consultant may request to extend the session before the session expires. They may request to extend the session by clicking, pressing, pushing or tapping on a button on the user interface of their computing device. If one party (either client or consultant) requests to extend the session, the other party may be informed of the request and may be allowed to either accept or reject the request to extend the session duration.

While a communication session is in progress, one party (either client or consultant) may choose to send an attachment to the other party. They may send an attachment by clicking, pressing, pushing or tapping on one or more buttons on the user interface of their computing device. Attachments can be in the form of a file such as a document, image or video. The attachment may also be a captured video, audio or image using the camera or microphone of the computing device of the party who sends the attachment. Attachments may be either stored on the computing device of the party who receives the attachment or viewed or heard only for a short period of time by the receiving party.

In one embodiment, the client and the consultant may agree to have at least one follow-up communication within a certain period of time or at a specific time in the future. For instance, the client and the consultant may agree to have a follow-up audio communication 30 minutes after an ongoing communication ends. In this embodiment, a request for a follow-up communication session may be sent by one party (either client or consultant) and accepted by the other party on their respective computing devices. Follow-up communications may require additional fee arrangements between the two parties. Such follow-up communications may be advantageous for example in cases when the consultant may have to study or research a problem that is discussed between the client and the consultant or in cases when the client may need to check or investigate a solution to a problem before more in-depth discussion with the consultant.

In some embodiments, the client may request to have a communication session with a specific consultant. The client may or may not determine the question or the topic of question. The client may select a specific consultant from a list of matching consultants displayed on the computing device of the client. Alternatively, the client may select a specific consultant with whom the client has communicated previously.

In one embodiment, more than two clients may participate in a communication session with one or more consultants. In this embodiment, a first client may initiate a session with at least one consultant, then the first client may send an invitation through a server to one or more other clients to join the session. Alternatively, a second client may send a request to join an ongoing communication session. The fee arrangement for the such multi-party communication sessions may be determined by the system, the first client or the consultant.

In another embodiment, at least one client may communicate with two or more consultants. In this embodiment, a client may either send an invitation through a server to one or more consultants or send a request to a server to find and add at least one additional consultant to an ongoing session between the client and another consultant.

A system comprising a computer implemented method for arranging communication between two or more users is disclosed. The computer method is programmed or implemented on the computing devices of the users to enable one of the users, namely the client, to send a request to a server to get connected to another user, namely the consultant. Herein, the request, may also be referred to as consultation request. The request sent by the computing device of the client, herein also referred to as client computing device, to the server may include a question, a topic of question, a subject matter, level of expertise of the consultant or the rating of the consultant. The client can then select one or more consultants from a list of matching consultants. The system will then establish a communication session to enable the client and the consultants to communicate in real-time. Herein, the computing device of the consultant may also be referred to as consultant computing device.

Although various embodiments of the system and method for arranging communication among two or more parties have been shown and described, modifications may occur to those skilled in the art upon reading the specification. The present application includes such modifications and is limited only by the scope of the claims. Moreover, in the following claims, the terms "first," "second," and "third," etc. are used merely as labels, and are not intended to impose numerical requirements on their objects or order of execution on their acts.

What is claimed is:

1. A computer-implemented method for arranging communication between two or more users, said two or more users comprising at least a first client and at least a first consultant, wherein a first computing device is associated with said at least first client and a second computing device is associated with said at least first consultant, the method comprising the following operations performed by at least one computer processor:

(a) enabling said at least first computing device to send a request to a server, (b) determining the geographic locations of the at least first client and one or more consultants by using geolocation technologies on one of or both the first computing device and computing devices of the consultants, (c) identifying, by the server, a list of matching consultants associated with said request based on the geographic location of the computing devices, wherein said at least first consultant is identified as a matching consultant from the list of matching consultants, (d) sending, by the server, a notification from said server to said second computing device to enable said at least first consultant to accept or decline the consultation request, (e) determining whether the at least first consultant accepts the consultation request after the server waits a predetermined time, (f) if the first consultant does not accept the request within the predetermined time, then sending, by the server, said notification to a second matching consultant, (g) if the first consultant accepts the request within a predetermined time, then establishing a communication session between said at least first client through said first computing device and said at least first consultant through said second computing device; and (h) enabling said at least first client and said at least first consultant to communicate in real-time if a communication session between said at least first client through said first computing device and said at least first consultant through said second computing device is established.

2. The computer-implemented method of claim 1, further comprising enabling the first client to select at least one consultant from the list of matching consultants.

3. The computer-implemented method of claim 1, wherein the request comprises at least one of:
a question,
a topic of question,
a subject matter,
level of expertise of a consultant, and
rating of a consultant.

4. The computer-implemented method of claim 1, wherein said at least first consultant is the first consultant from the list of matching consultants to accept the consultation request.

5. The computer-implemented method of claim 1, wherein the communication includes voice communication.

6. The computer-implemented method of claim 1, wherein the request includes a duration for the communication session.

7. The computer-implemented method of claim 1, further comprising enabling transfer of funds from a financial account of said at least first client to a financial account of said at least first consultant.

8. The computer-implemented method of claim 1, further comprising presenting by the server to the client with minimum and maximum fees, and a median or average fee for the communication session for the client to select; and selecting the fee to be paid to the consultant.

9. The computer-implemented method of claim 1, further comprising determining, using the server, the fee for the communication session, wherein the server determines the fee based on one or a combination of the subject matter, topic of question, communication type, and duration of the communication session.

10. The computer-implemented method of claim 1, further comprising sending a request to extend the session before the session expires.

11. The computer-implemented method of claim 1, further comprising sending an attachment of a captured video, audio or image using the camera or microphone of the computing device of the party who sends the attachment.

12. The computer-implemented method of claim 1, further comprising prioritizing, by the server, the matching consultants based on one or more criteria to send them the consultation request.

13. A system for enabling real-time communication between two or more users, said two or more users comprising at least one client and at least one consultant, the system comprising:
at least one client computing device, wherein said client computing device comprises:
client computing device memory,
one or more client computing device processors,
client computing device network resources, and
client computing device peripherals,
at least one consultant computing device, wherein said consultant computing device comprises:
consultant computing device memory,
one or more consultant computing device processors,
consultant computing device network resources, and
consultant computing device peripherals,
wherein the one or more client computing device processors are configured by a first set of instructions to enable said at least one client operating the client computing device to send a consultation request to a server,
wherein the geographic locations of the at least first client and one or more consultants are determined by using geolocation technologies on one of or both the first computing device and computing devices of the consultants,
wherein the server is configured to identify a list of matching consultants associated with said consultation request based on the geographic locations of the computing devices, wherein said at least one consultant is identified as a matching consultant from the list of matching consultants,
wherein the one or more consultant computing device processors are configured by a second set of instructions to enable said at least one consultant that operates the computing device to accept or decline the consultation request,
wherein the server is configured to determine whether the at least one consultant accepts the consultation request after a predetermined time and send said notification to a second matching consultant if the at least one consultant does not accept the request within the predetermined time, and
wherein the one or more client computing device processors and the one or more consultant computing device processors are configured by a third set of instructions to:
establish a communication session between said at least one client and said at least one consultant if the server determines that the at least one consultant accepts the request within a predetermined time; and
enable said at least one client and said at least one consultant to communicate in real-time if the server determines that the at least one consultant accepts the request within the predetermined time.

14. The system of claim 13, wherein the one or more processors on the client computing device are further configured by a fourth set of instructions to enable said client to select at least one consultant from the list of matching consultants.

15. The system of claim 13, wherein the consultation request sent by the client computing device to the server comprises at least one of:
- a question,
- a topic of question,
- a subject matter,
- level of expertise of a consultant,
- rating of a consultant.

16. The system of claim 13, wherein the communication session is established between said at least one client and the first consultant who accepts the consultation request, wherein said at least one consultant is the first consultant from the list of matching consultants that accepts the consultation request.

17. The system of claim 13, wherein the consultation request includes a duration for the communication session.

18. The system of claim 13, further comprising enabling transfer of funds from the financial account of said at least one client to the financial account of said at least one consultant.

19. The system of claim 13, wherein the one or more client computing device peripherals comprise at least one of or any combination of a client computing device microphone, a client computing device camera, client computing device speaker, and a client computing device keyboard, and wherein the one or more consultant computing device peripherals comprise at least one of or any combination of a consultant computing device microphone, a consultant computing device camera, a consultant computing device speaker, and a consultant computing device keyboard.

20. The computer-implemented method of claim 12, wherein the one or more criteria is one of or any combination of the level of knowledge of the consultant, the rating in the subject matter of the question that is asked by the first client of the consultant, the courtesy rating, geographic location with respect to the first client of the consultant, level of activeness of the consultant, certifications related to the subject matter of the question that is asked by the first client, and whether they are verified experts in the subject matter of the question that is asked by the first client.

* * * * *